Oct. 31, 1933.  K. JAGSCHITZ  1,933,142
METHOD OF MANUFACTURING SHELL RINGS FOR GAS HOLDERS
Filed Sept. 5, 1931
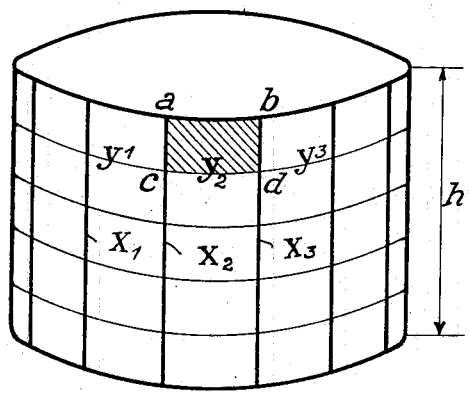
Inventor:
KONRAD JAGSCHITZ
By Joseph Hirschman
Attorney Patented Oct. 31, 1933

1,933,142

UNITED STATES PATENT OFFICE 1,933,142

METHOD OF MANUFACTURING SHELL RINGS FOR GAS HOLDERS

Konrad Jagschitz, Mainz, Germany, assignor to Maschinenfabrik Augsburg-Nurnberg A. G., Nuremberg, Germany, a corporation of Germany Application September 5, 1931, Serial No. 561,365, and in Germany September 10, 1930

3 Claims. (Cl. 113—120)

The cylindrical or polygonal shell rings of telescopic or bell-shaped gas holders are generally composed of sheet-metal plates of commercial size, especially if large-sized holders are to be made, the plates being arranged in horizontal or in vertical rows. If, as is desired with a view to obtaining a smooth surface of the shell rings, the individual plates are united with one another by welded seams, and if sheet-metal of only a few mm. thickness is used, the union of plates by butt welding can be carried out without any particular difficulty, if the seams extend vertically, whereas the difficulties encountered with horizontal butt welding of the seams are so great that it is practically impossible to make use of this procedure.

The present invention relates to an improved method by which the difficulties hitherto met with in welding thin plates along horizontal seams are obviated. According to this method, the metal sheets required for the shell rings are united with one another, preferably and especially by butt welding, in a horizontal plane, that is to say, they are placed side by side on a suitable flat support and are welded together thereon, the united sheets forming thin strips, the breadth of which corresponds to the length of a sheet and the length of which corresponds to the height of the shell. The horizontal welding seams are, thus, made not at the shell or bell with the plates arranged in vertical planes, but on the horizontal flat support prior to the erection of the shell or bell. The thus produced sheet-metal strips are lifted into vertical position at the bell, and the strips necessary for the bell are united with one another successively by vertically extending butt welding seams which can be effected as easily as heretofore. The strips remain flat, if the bell of the gas holder is to be polygonal, or they are curved transversely if the bell is to be circular or cylindrical, the degree of the bending corresponding, of course, to the diameter of the bell.

The invention is illustrated diagrammatically by way of example on the accompanying drawing on which is shown a perspective view of a gas holder shell composed of thin sheet-metal plates according to this invention. One of the plates $(a, b, c, d)$ is hatched. The holder is composed of such plates as $a, b, c, d$, and as many thereof are placed side by side horizontally on a flat support as corresponds to the height $h$ of the shell of the bell. These plates are united with one another by butt welding so that the strip having the length $h$ corresponds to the height of the shell. The finished strip is then lifted into vertical position, as is, or are, also the neighboring strip or strips, and all strips are united with one another successively by vertical welding seams $x^1, x^2, x^3 \ldots$ In this way the necessity for producing horizontal welding seams $(y^1, y^2, y^3 \ldots)$ while the plates are in erected, vertical position is eliminated.

If the bell is to be very high, two or more strips of united sheet-metal plates may be arranged vertically one above the other, the strips being connected with one another by means of flanges and packings and bolts, or in any equivalent way, the entire length or height of the connected strips being equal to the height of the shell of the bell, and all sets of strips together (after having been united with one another by vertical butt welding seams) constituting the shell.

I claim:

1. The method of manufacturing cylindrical or polygonal shells for telescopic, bell-shaped or waterless gas holders from thin sheet-metal plates united with one another by welding, said method comprising placing a plurality of said plates side by side in horizontal position, uniting them with one another by welding, lifting the thus formed strip into vertical position, lifting a similarly formed strip into vertical position adjoining the first-mentioned strip, and uniting the strips with one another along a vertical seam by welding, substantially as set forth.

2. The method of manufacturing cylindrical or polygonal shells for telescopic, bell-shaped or waterless gas holders, comprising placing a plurality of thin sheet-metal plates side by side in horizontal position on a flat horizontal support, uniting said plates with one another by butt welding; lifting the strip thus formed at the place where the gas holder shell is to be made; lifting similarly formed strips at the place stated, and uniting all strips successively with one another along vertical seams by butt welding, substantially as set forth.

3. The method of manufacturing cylindrical or polygonal shells for telescopic, bell-shaped or waterless gasholders comprising placing a plurality of thin sheet-metal plates side by side in horizontal position on a support, uniting said plates with one another by butt welding to form a strip co-extensive in length with the intended height of the side wall of which said strip is to constitute a vertical component, said strip having parallel, rectilinear margins lengthwise throughout its extent; lifting the strip thus formed at the place where the gasholder shell is to be made; lifting similarly formed strips at the place stated, and uniting all of said strips successively with one another by butt welding along vertical seams respectively rectilinear continuously throughout the height of said side wall.

KONRAD JAGSCHITZ.